Jan. 13, 1925.
C. R. MARKE
1,523,228
JAR CLAMP
Filed Oct. 21, 1922
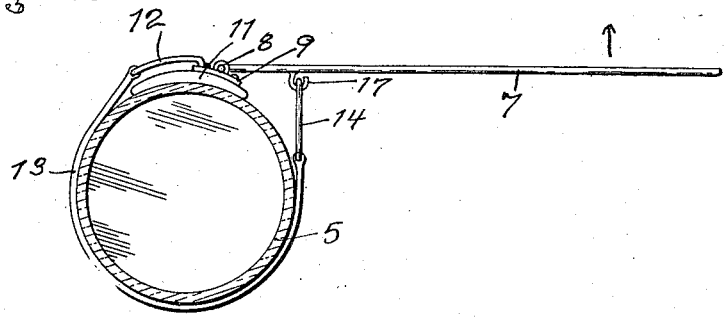
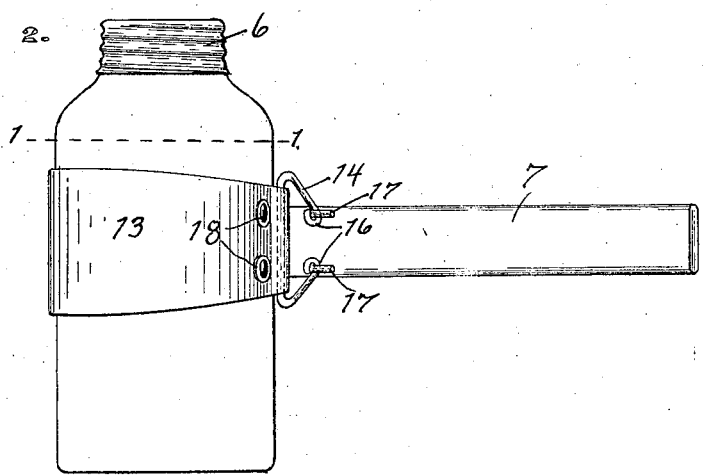
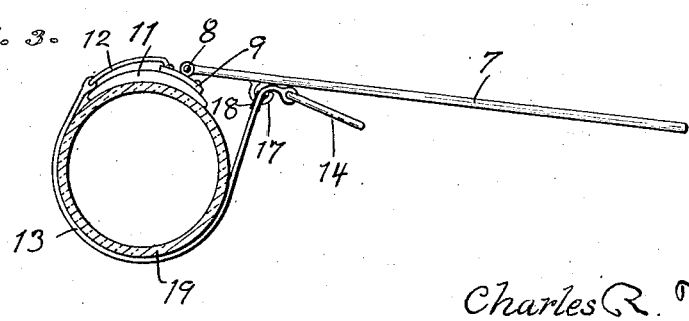
Inventor:
Charles R. Marke
Attorney:
Victor J Evans Patented Jan. 13, 1925.

1,523,228

UNITED STATES PATENT OFFICE.

CHARLES R. MARKE, OF ARMONA, CALIFORNIA.

JAR CLAMP.

Application filed October 21, 1922. Serial No. 596,093.

*To all whom it may concern:*

Be it known that I, CHARLES R. MARKE, a citizen of the United States, residing at Armona, in the county of Kings and State of California, have invented new and useful Improvements in Jar Clamps, of which the following is a specification.

This invention relates to new and useful improvements in jar clamps and has particular reference to a clamp capable of being placed about a glass jar for the purpose of holding the same against rotation while a cap is being screwed thereon.

The principal object of this invention is to provide a clamp which will firmly grasp a glass jar in such a manner that the same will not rotate with respect to the clamp, and also to provide a clamp which will not exert excessive pressure on any point of the jar, thereby tending to crack or crush the walls thereof.

A still further object is to provide a clamp of this nature which is simple to operate, cheap to manufacture and one which may be employed on jars of various sizes.

A still further object is to provide a clamp having a portion formed of rubber which portion when contacted with the glass forms a most intimate contact and thereby prevents slipping of the clamp while the same is being tightened.

Other objects and advantages will be apparent during the course of the following description.

In the accompanying drawings forming a part of this specification, and in which like numerals are employed to designate like parts throughout the same.

Figure 1 is a cross section taken on the line 1—1 of Figure 2, showing the position my clamp assumes when placed about a jar, Figure 2 is a side elevation of Figure 1, Figure 3 is a cross section similar to Figure 1, showing the clamp applied to a jar of a smaller capacity than that shown in Figure 1.

Applicant is aware of the fact that many devices have been employed for holding jars, while the top is being secured thereto. These clamps however, result in the breaking of many jars, are cumbersome to operate and expensive to manufacture. I have therefore sought to eliminate these objections by providing a clamp having a lever, a rubber pad pivoted to the end of the lever, a web portion also pivoted to the lever and fastened around the jar and then secured to the handle of the lever. In this manner I am enabled to securely grasp a jar without the danger of breaking, or slipping in a quick and efficient manner.

In the accompanying drawings wherein for the purpose of illustration is shown a preferred embodiment of my invention, the numeral 5 designates a jar of a two quart capacity. This jar is provided with the usual cap 6 which is screw threaded upon the jar 5. It is customary to place a rubber gasket between the top of the jar 5 and the cap 6 and to properly seal the cap and jar together, and the cap must be tightly screwed upon the gasket before mentioned.

Owing to the size and cumbersomeness of the jars and caps it is often almost impossible for a canner to secure sufficient contact with this gasket to prevent leakage of air therethrough, and consequently the spoiling of the contents of the jar.

I therefore employ a lever 7 which is pivoted as at 8 to a plate 9. This plate has secured thereto a rubber pad 11 which pad is preferably shaped so as to conform to the shape of the exterior wall of the jar. A wire 12 is pivoted to the plate 9 and has secured thereto a web 13. This web is adapted to pass around the jar 5 and is provided at its opposite end with a substantially U shaped member 14. This U shaped member 14 is provided with eyes as shown at 16. The purpose of these eyes is to engage hooks 17 secured to the handle 7, a short distance from the pivoted point 8.

Within the web portion 13, I provide eyelets 18 which eyelets are spaced apart a distance equal to the hooks 17. The purpose of these eyelets is to provide for the shortening of the web when the device is being used upon a jar of smaller size as shown in Figure 3, wherein the numeral 19 refers to a jar of one quart capacity.

The operation of my device is as follows:—

The clamp is placed about the jar as shown in Figure 1, that is so that the pad 11 contacts the jar and the web 13 passes around the jar. By now moving the handle 7 slightly in the direction of the arrow of this figure, the web 13 will be tightened and pressure will be applied to the rubber pad 11. As rubber and glass form a very intimate contact one with the other, a very decided gripping action takes place which gripping action prevents the jar from rotating with respect to the clamp without the exertion of any considerable pressure upon the walls of the jar. When it is desired to employ the clamp upon a smaller sized jar the hooks 17 are caused to engage the eyelets 18 rather than the eyes 16 of the U shaped member 14.

It is to be understood that the form of my invention herewith shown and described is to be taken as a preferred example of the same, and that various changes relative to the shape, size and arrangement of parts may be resorted to without departing from the spirit of the invention or the scope of the subjoined claim.

Having thus described my invention, I claim:—

In a device of the character described a plate, a lever pivotally connected to said plate, hook elements on said lever, a cushion element carried by said plate, a wire pivoted to said plate, a web of substantial width engaging the outer periphery of a jar body, and fastening means carried by the free end of the web for engaging the hook elements of the lever whereby jars of varying diameters are held against rotation, said means including a U-shaped member and eyelets spaced therefrom.

In testimony whereof I affix my signature.

CHARLES R. MARKE.